(12) United States Patent
Al Kiswany et al.

(10) Patent No.: US 8,442,955 B2
(45) Date of Patent: May 14, 2013

(54) VIRTUAL MACHINE IMAGE CO-MIGRATION

(75) Inventors: Samer Al Kiswany, Vancouver (CA); Comeliu Mihail Constantinescu, San Jose, CA (US); Prasenjit Sarkar, San Jose, CA (US); Mark J. Seaman, San Jose, CA (US); Dinesh K. Subhraveti, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 6 days.

(21) Appl. No.: 13/075,623

(22) Filed: Mar. 30, 2011

(65) Prior Publication Data
US 2012/0254131 A1 Oct. 4, 2012

(51) Int. Cl.
*G06F 17/00* (2006.01)
(52) U.S. Cl.
USPC ........... 707/692; 707/610; 707/640; 707/661; 709/201; 709/223
(58) Field of Classification Search ........................ None
See application file for complete search history.

(56) References Cited

U.S. PATENT DOCUMENTS

| | | | |
|---|---|---|---|
| 7,526,515 B2 | 4/2009 | Broussard et al. | |
| 7,730,486 B2 | 6/2010 | Herington | |
| 2008/0163239 A1* | 7/2008 | Sugumar et al. | 718/105 |
| 2008/0222375 A1* | 9/2008 | Kotsovinos et al. | 711/162 |
| 2009/0271588 A1 | 10/2009 | Barsness et al. | |
| 2009/0271807 A1 | 10/2009 | Barsness et al. | |
| 2010/0088499 A1* | 4/2010 | Zimmer et al. | 713/2 |
| 2010/0250508 A1* | 9/2010 | Erofeev | 707/704 |
| 2010/0274981 A1* | 10/2010 | Ichikawa | 711/162 |
| 2010/0306493 A1* | 12/2010 | Carrillo et al. | 711/167 |
| 2010/0332658 A1* | 12/2010 | Elyashev | 709/226 |
| 2011/0066819 A1* | 3/2011 | Mashtizadeh et al. | 711/162 |
| 2012/0084445 A1* | 4/2012 | Brock et al. | 709/226 |
| 2012/0084527 A1* | 4/2012 | Jayaraman et al. | 711/165 |
| 2012/0221845 A1* | 8/2012 | Ferris | 713/150 |

OTHER PUBLICATIONS

Park et al, "Supporting Practical Content-Addressable Caching with CZIP Compression", USENIX Association, 2007.*
Clark et al, "Live Migration of Virtual Machines", USENIX Association, 2005.*
Huang et al, "High Performance Virtual Machine Migration with RDMA over Modern Interconnects", 2007.*
Nelson et al, "Fast Transparent Migration for Virtual Machines", VMware Inc, 2005.*
Broadcom Ethernet Network Controller Enhanced Virtualization Functionality, Oct. 2009.
Virtualization Microsoft SharePoint 2010 and Microsoft Dynamics CRM 4.0, Jul. 2010.
Getting the MAX from your Virtualized Environment: Comprehensive Solutions from VMware and IBM, 2010.

(Continued)

*Primary Examiner* — Hung Le
(74) *Attorney, Agent, or Firm* — Lieberman & Brandsdorfer, LLC

(57) ABSTRACT

Embodiments of the invention relate to co-migration in a shared pool of resources with similarity across data sets of a migrating application. The data sets are processed and profiled. Metadata is reviewed to remove duplicate elements and to distribute the processing load across available nodes. At the same time, a ranking may be assigned to select metadata to support a prioritized migration. Non-duplicate data chunks are migrated across the shared pool of resources responsive to the assigned prioritization.

18 Claims, 11 Drawing Sheets

OTHER PUBLICATIONS

VMware vSphere 4 and Cisco Nexus 1000V Series: Accelerate Data Center Virtualization, 2008.

Moreton, T., A Wide-Area File System for Migrating Virtual Machines, University of Cambridge, Computer Laboratory, Technical Report No. 714, Mar. 2008.

Muthitacharoen, A., et al., A Low-bandwidth Network File System, SOSP 2001.

Rhea et al., Fast, Inexpensive Content-Addressed Storage in Foundation, USENIX Annual Technical Conference 2008.

Al Kiswany et al., stdchk: A Checkpoint Storage System for Desktop Grid Computing, International Conference on Distributed Computing Systems (ICDCS '08), Beijing, China 2008.

Quinlan et al., Venti: A New Approach to Archival Storage, FAST 2002, Monterey, CA.

Rabin, Fingerprinting by Random Polynomials, Center for Research in Computing Technology, Technical Report TR-15-81, Harvard University, 1981.

Eshghi et al., JumboStore: Providing Efficient Incremental Upload and Versioning for a Utility Rendering Service, FAST 2007.

Zhu et al., Avoiding the Disk Bottleneck in the Data Domain Deduplication File System, FAST 2008.

Yang et al., DEBAR: A Scalable High-Performance De-duplication Storage System for Backup and Archiving, University of Nebraska-Lincoln, Computer Science and Engineering, Technical Report, TR-UNL-CSE-2009-0004, Jan. 2009.

Karger et al., Consistent Hashing and Random Trees: Distributed Caching Protocols for Relieving Hot Spots on the World Wide Web, ACM Symposium on Theory of Computing (STOC), 1997.

Stoica et al., Chord: A Scalable Peer-to-peer Lookup Service for Internet Applications, SIGCOMM 2001.

\* cited by examiner

VIRTUAL MACHINE IMAGE CO-MIGRATION

BACKGROUND

This invention relates to migration of a virtual machine image in a computer system environment. More specifically, the invention relates to data chunking one or more virtual machine images and exploiting similarities among virtual machine image data chunks to distribute migration workload.

A virtual machine is a self contained operating environment that behaves as if it is a separate computer, while allowing the sharing of underlying physical machine resources between multiple virtual machines. Each virtual machine operates as a whole machine, while a host of the virtual machine(s) manages resources to support each virtual machine. For example, a virtual machine consists of CPUs, memory, and I/O slots that are a subset of the pool of available resources within a computer system. Each of the virtual machines within the computer system is capable of running a version of an operating system and a set of application workloads.

Virtual machines reside on a physical machine. A virtual machine image, also known as a virtual disk image, is a single file or group of files that has a well defined format and is interpreted by an infrastructure of a shared pool of resources as a hard disk. Migrating a virtual machine image across data centers is a challenging task due to load associated with size and organizational constraints. More specifically, one application may incorporate two or more virtual machine images, so that migration of a virtual machine image may involve migration of multiple virtual machine images. Network bandwidth also affects migration. More specifically, network bandwidth has limits, which may be exceeded due to the size of the virtual machine image, and that the migration is employing more than one virtual machine image. Accordingly, there is a need to effectively and efficiently manage migration of virtual machine images across data centers.

BRIEF SUMMARY

This invention comprises a method, system, and article for co-migration of data sets in a shared pool of resources, and for profiling aspects of the data sets to support efficient migration.

In one aspect of the invention, a method is provided for migration of data sets. Two or more data sets are provided operating in a computer system, with not more than one data set assigned to a single node. Each data set is profiled, which includes dividing each data set into multiple data chunks, applying a hash algorithm to each data chunk, and assigning a hash value to each data chunk. Once the hash algorithm is completed, a hash value range is assigned to each node. The hash values within the range of a data set are stored in local memory of the assigned node. For efficiency and removal of redundant entries, duplicate data chunks are removed. The removal process includes comparing hash values of at least two data sets, and for each duplicate hash value retaining only a single copy. As such, each node retains only non-duplicate data chunks within the hash value range assigned to the node. Once the removal of duplicate entries is complete, the non-duplicate data chunks may be migrated.

In another aspect of the invention, a computer system is provided with at least two data sets, with not more than one data set assigned to a single node. A profile manager is provided to profile each data set. More specifically, the profile manager divides each data set into two or more data chunks and then applies a hash value to each data chunk. A hash manager is provided in communication with the profile manager. The hash manager assigns a hash range to each node and stores the hash values within the range in local memory of the assigned node. A comparison manager is provided in communication with the hash manager. The comparison manager compares hash values of each of the data sets. More specifically, the comparison manager retains a single copy of an identified duplicate hash value so that each node only retains non-duplicate data chunks within the assigned hash value range. A migration manager is provided in communication with the comparison manager. The migration manager facilitates migration and limits migration of the hashed data chunks to non-duplicate data chunks.

In yet another aspect of the invention, a computer program product is provided with a computer readable storage medium having embodied computer readable program code. More specifically, computer readable program code is provided to profile each data set operating within a computer system, with each node limited to not more than one data set. Computer readable program code is provided to divide each data set into at least two data chunks, and to apply a hash value to each data chunk. In addition, computer readable program code is provided to assign a hash value range to each node in the system, and to store hash values within the range in local memory of the assigned node. To mitigate processing, duplicate data chunks are removed. More specifically, computer readable program code is provided to compare hash values of two or more data sets. For each duplicate hash value, a single copy of the duplicate hash value is retained. More specifically, each node retains non-duplicate data chunks within the hash value range assigned to the node. Once the duplicate data chunks have been removed, computer readable program code is employed to facilitate migration of the non-duplicate data chunks.

In a further aspect of the invention, a method is provided in a computer system to support co-migration across a pool of shared resources. Each data set is profiled. The profiling includes dividing each data set into two or more data chunks, applying a hash value to each data chunk, and prioritizing the data chunks. Following the profiling, a hash value range is assigned to each node. The hash values are stored within the hash value range of a data set in memory local to an assigned node. Duplicate data chunks in the system are eliminated. More specifically, each node retains non-duplicate data chunks within the hash value range assigned to the node. Following processing of the duplicate data chunks, the non-duplicate data chunks are migrated responsive to the prioritization.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

Figure 1:
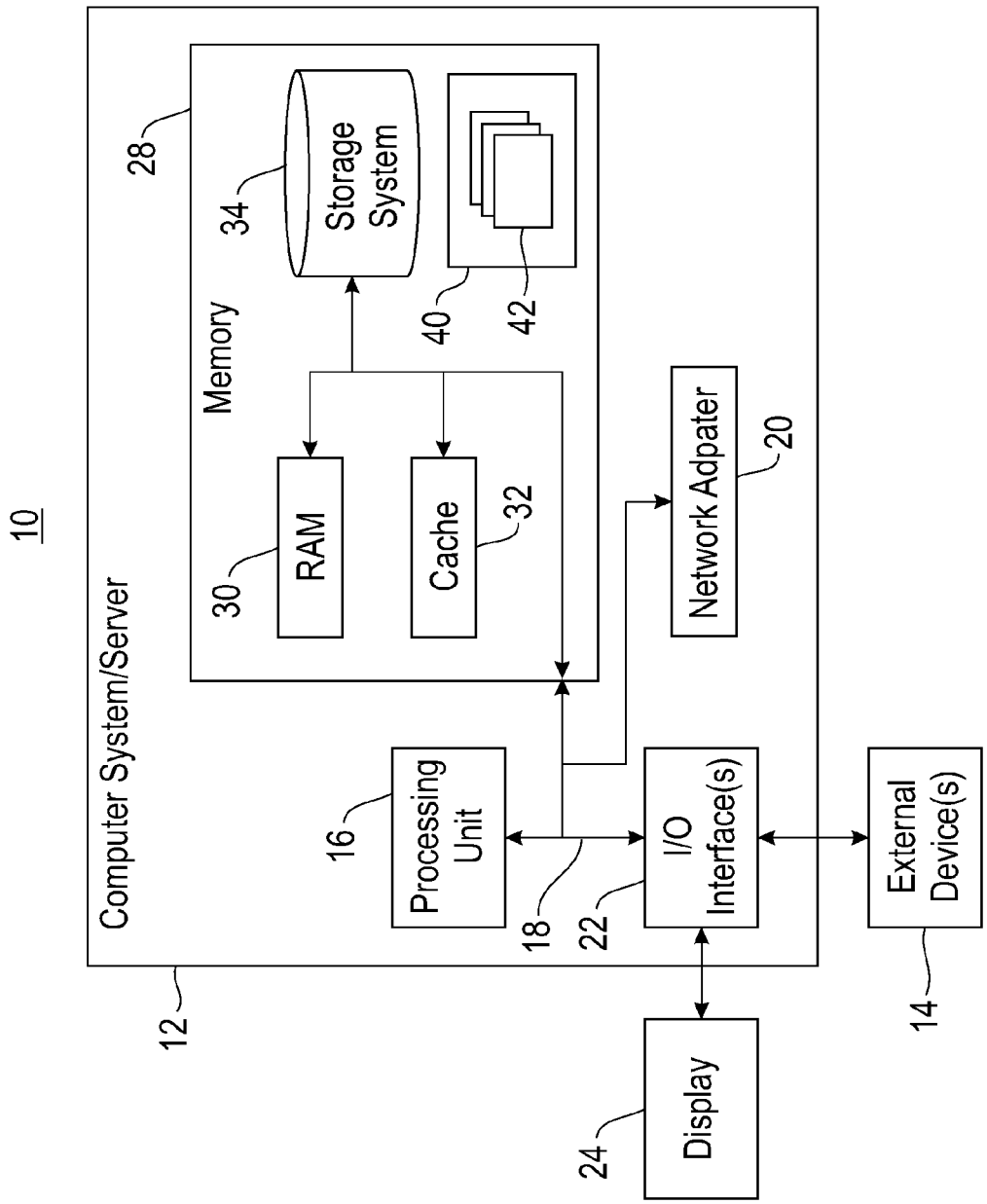
FIG. 1 depicts a cloud computing node according to an embodiment of the present invention.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as managers. A manager may be implemented in programmable hardware devices such as field programmable gate arrays, programmable array logic, programmable logic devices, or the like. The manager may also be implemented in software for processing by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the manager and achieve the stated purpose of the manager.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of a profile manager, a hash manager, a migration manager, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

A cloud computing environment is service oriented with a focus on statelessness, low coupling, modularity, and semantic interoperability. At the heart of cloud computing is an infrastructure comprising a network of interconnected nodes. Referring now to FIG. 1, a schematic of an example of a cloud computing node is shown. Cloud computing node (10) is only one example of a suitable cloud computing node and is not intended to suggest any limitation as to the scope of use or functionality of embodiments of the invention described herein. Regardless, cloud computing node (10) is capable of being implemented and/or performing any of the functionality set forth hereinabove. In cloud computing node (10) there is a computer system/server (12), which is operational with numerous other general purpose or special purpose computing system environments or configurations. Examples of well-known computing systems, environments, and/or configurations that may be suitable for use with computer system/server (12) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (12) may be described in the general context of computer system-executable instructions, such as program modules, being executed by a computer system. Generally, program modules may include routines, programs, objects, components, logic, data structures, and so on that perform particular tasks or implement particular abstract data types. Computer system/server (12) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server (12) in cloud computing node (10) is shown in the form of a general-purpose computing device. The components of computer system/server (12) may include, but are not limited to, one or more processors or processing units (16), a system memory (28), and a bus (18) that couples various system components including system memory (28) to processor (16). Bus (18) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server (12) typically includes a variety of computer system readable media. Such media may be any available media that is accessible by computer system/server (12), and it includes both volatile and non-volatile media, removable and non-removable media.

System memory (28) can include computer system readable media in the form of volatile memory, such as random access memory (RAM) (30) and/or cache memory (32). Computer system/server (12) may further include other removable/non-removable, volatile/non-volatile computer system storage media. By way of example only, storage system (34) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (18) by one or more data media interfaces. As will be further depicted and described below, memory (28) may include at least one program product having a set (e.g., at least one) of program modules that are configured to carry out the functions of embodiments of the invention.

Program/utility (40), having a set (at least one) of program modules (42), may be stored in memory (28) by way of example, and not limitation, as well as an operating system, one or more application programs, other program modules, and program data. Each of the operating systems, one or more application programs, other program modules, and program data or some combination thereof, may include an implementation of a networking environment. Program modules (42) generally carry out the functions and/or methodologies of embodiments of the invention as described herein.

Computer system/server (12) may also communicate with one or more external devices (14), such as a keyboard, a pointing device, a display (24), etc.; one or more devices that enable a user to interact with computer system/server (12); and/or any devices (e.g., network card, modem, etc.) that enable computer system/server (12) to communicate with one or more other computing devices. Such communication can occur via Input/Output (I/O) interfaces (22). Still yet, computer system/server (12) can communicate with one or more networks such as a local area network (LAN), a general wide area network (WAN), and/or a public network (e.g., the Internet) via network adapter (20). As depicted, network adapter (20) communicates with the other components of computer system/server (12) via bus (18). It should be understood that although not shown, other hardware and/or software components could be used in conjunction with computer system/server (12). Examples, include, but are not limited to: microcode, device drivers, redundant processing units, external disk drive arrays, RAID systems, tape drives, and data archival storage systems, etc.

Figure 2:
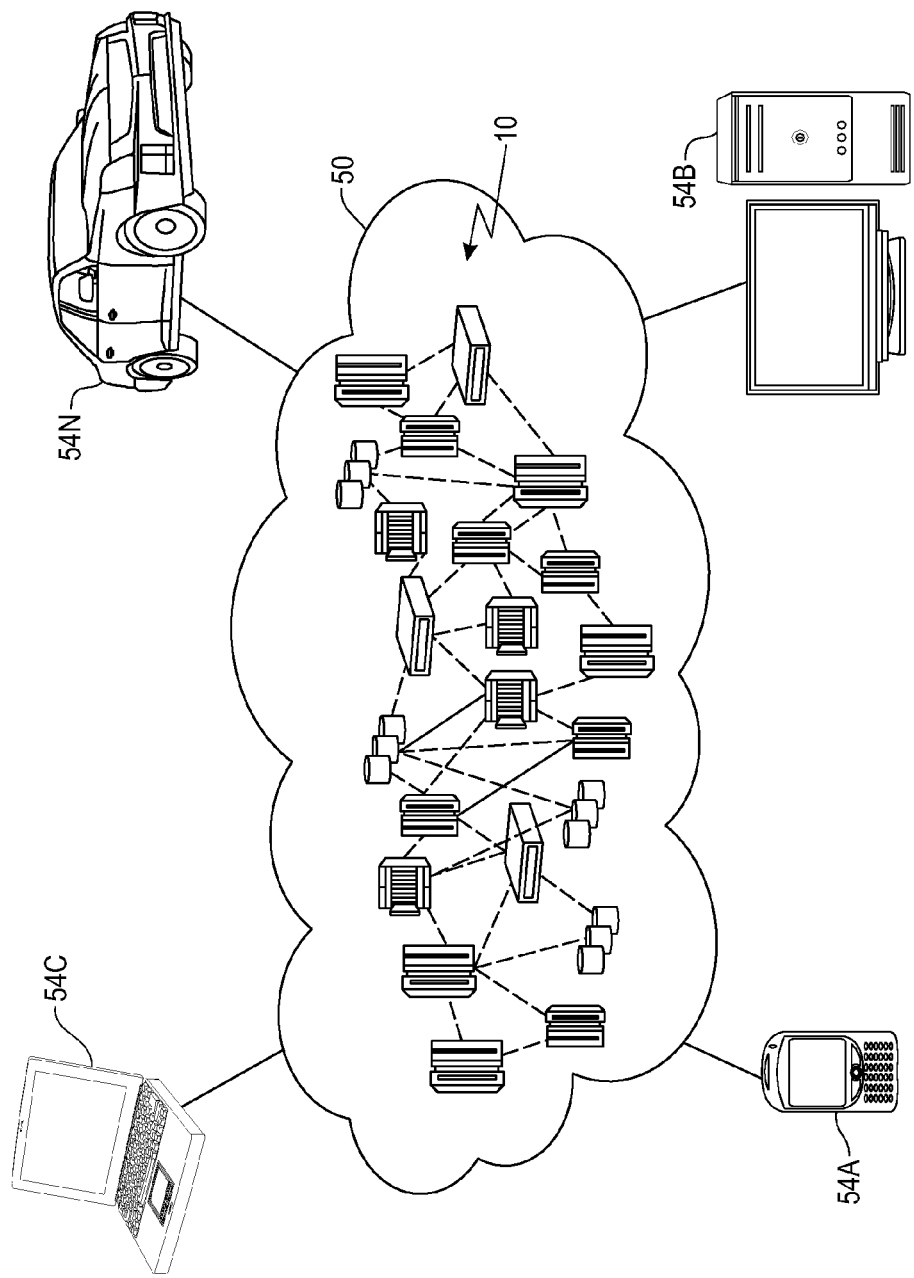
FIG. 2 depicts a cloud computing environment according to an embodiment of the present invention.

Referring now to FIG. 2, illustrative cloud computing environment (50) is depicted. As shown, cloud computing environment (50) comprises one or more cloud computing nodes (10) with which local computing devices used by cloud consumers, such as, for example, personal digital assistant (PDA) or cellular telephone (54A), desktop computer (54B), laptop computer (54C), and/or automobile computer system (54N) may communicate. Nodes (10) may communicate with one another. They may be grouped (not shown) physically or virtually, in one or more networks, such as Private, Community, Public, or Hybrid clouds as described hereinabove, or a combination thereof. This allows cloud computing environment (50) to offer infrastructure, platforms and/or software as services for which a cloud consumer does not need to maintain resources on a local computing device. It is understood that the types of computing devices (54A)-(54N) shown in FIG. 2 are intended to be illustrative only and that computing nodes (10) and cloud computing environment (50) can communicate with any type of computerized device over any type of network and/or network addressable connection (e.g., using a web browser).

Figure 3:
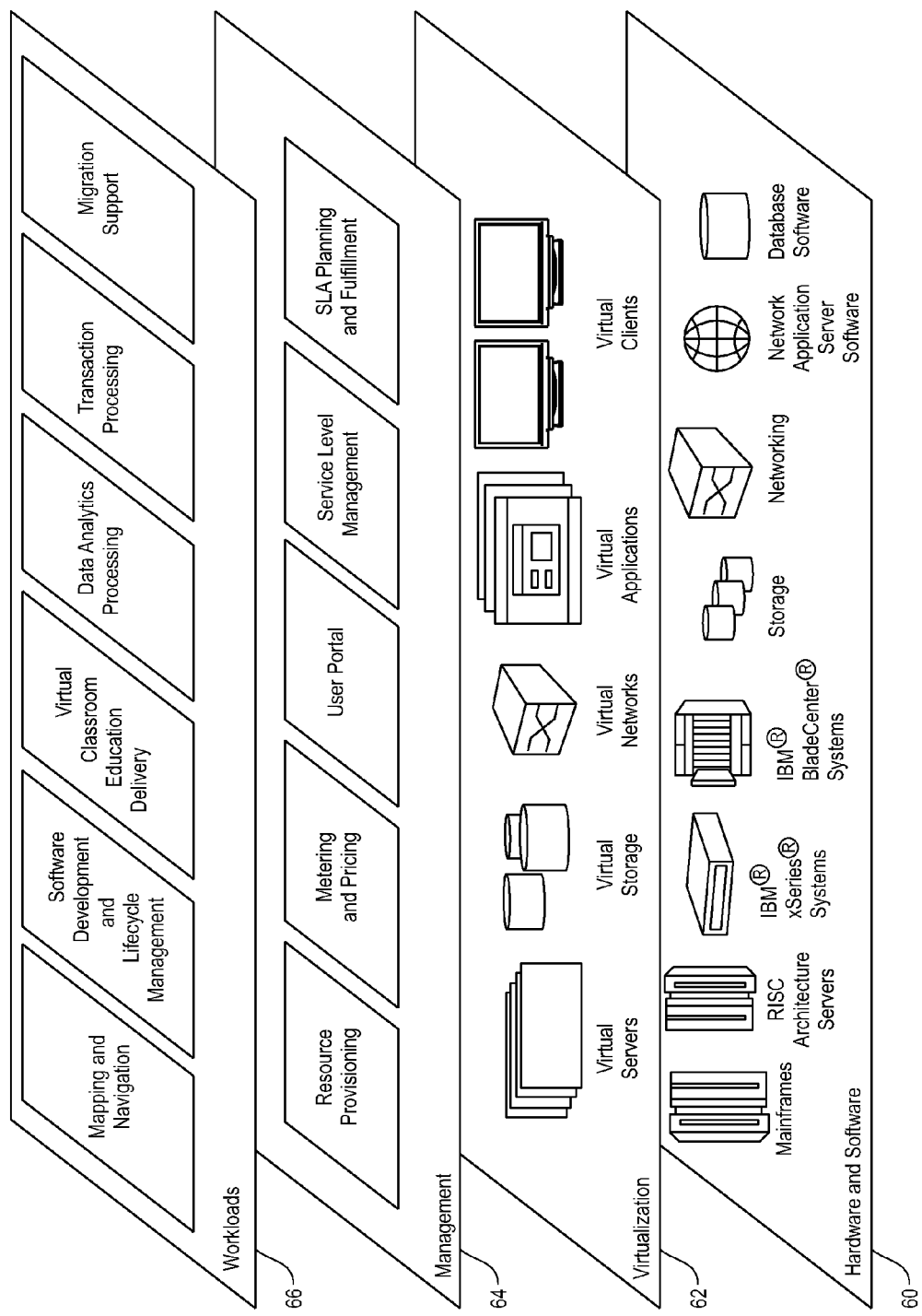
FIG. 3 depicts abstraction model layers according to an embodiment of the present invention.

Referring now to FIG. 3, a set of functional abstraction layers provided by cloud computing environment (50) (FIG. 2) is shown. It should be understood in advance that the components, layers, and functions shown in FIG. 3 are intended to be illustrative only and embodiments of the invention are not limited thereto. As depicted, the following layers and corresponding functions are provided: hardware and software layer (60), virtualization layer (62), management layer (64), and workload layer (66). The hardware and software layer (60) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (62) provides an abstraction layer from which the following examples of virtual entities may be provided: virtual servers; virtual storage; virtual networks, including virtual private networks; virtual applications and operating systems; and virtual clients.

In one example, management layer (64) may provide the following functions: resource provisioning, metering and pricing, user portal, service level management, and SLA planning and fulfillment. The functions are described below. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (66) provides examples of functionality for which the cloud computing environment may be utilized. Examples of workloads and functions which may be provided from this layer includes, but are not limited to: mapping and navigation; software development and lifecycle management; virtual classroom education delivery; data analytics processing; transaction processing; and creation and maintenance of profile data for co-migration within the cloud computing environment.

Virtual machine image de-duplication is a technique based upon dividing the virtual machine image into data chunks and identifying duplicate data chunks. A unique hash is applied to each data chunk. Prior to or during migration of the virtual machine images, the hashes are compared and duplicate hashes are removed. This enables the migration to exploit similarities across virtual machines. More specifically, by identifying and removing duplicate elements of the virtual machine image, the migration is limited to the non-duplicate data chunks, thereby minimizing network traffic. In one embodiment, the hashed data chunks are prioritized according to a profile and may then be employed for profile based migration to support prioritized migration of previously identified and designated data chunks.

Figure 4:
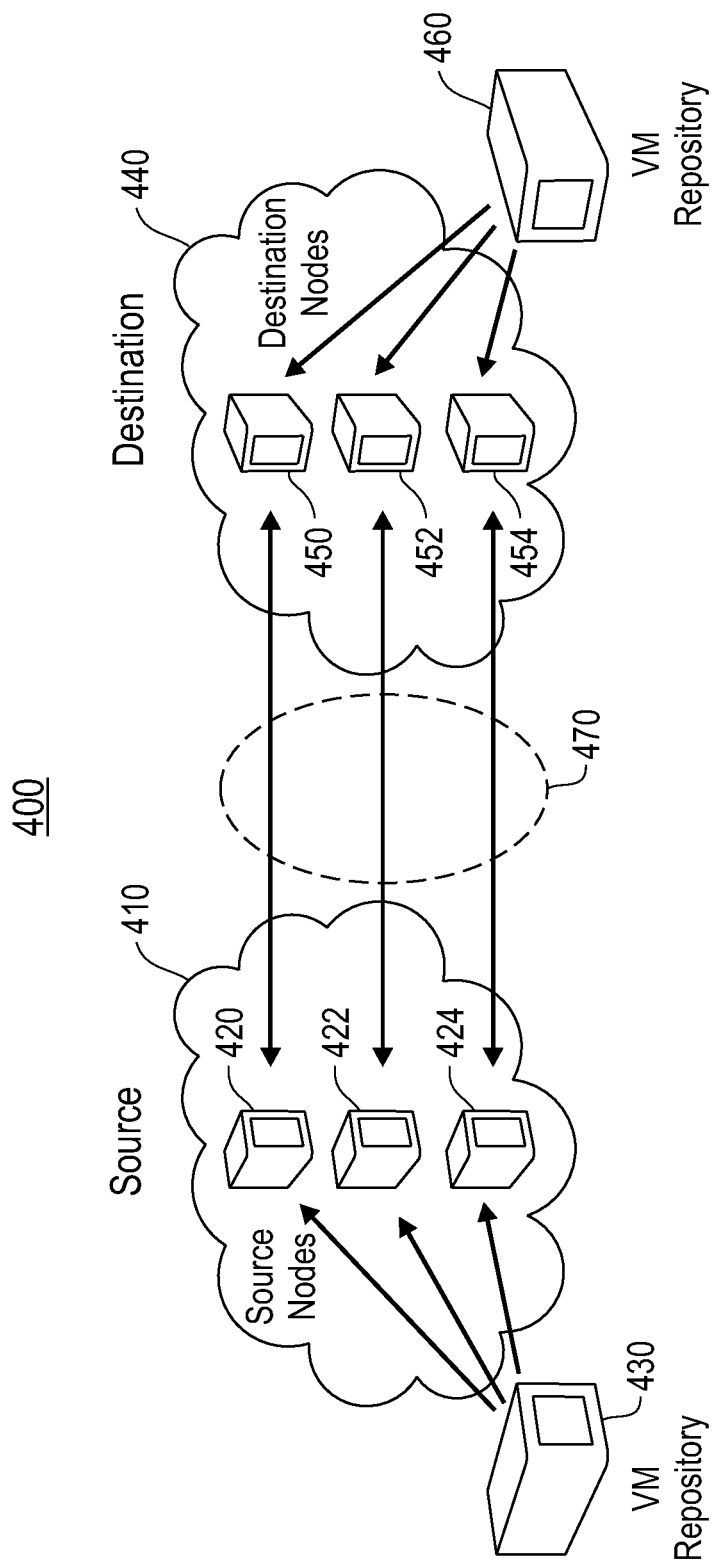
FIG. 4 depicts a block diagram of the system showing the general configuration of the source and destination.

A system comprising a set of source nodes in communication with a set of destination nodes is provided. FIG. 4 is a block diagram (400) of the system showing the general configuration of the source and destination. More specifically, a source site (410) is provided with a set of source nodes (420), (422), and (424) and a source virtual machine repository (430) in communication with the source nodes. Similarly, a destination site (440) is provided with a set of destination nodes (450), (452), and (454) and a destination virtual machine repository (460) in communication with the destination nodes. A mapping (470) is provided, wherein each source node is mapped to a destination node. More specifically, source node (422) is mapped to destination node (452), source node (424) is mapped to destination node (454), and source node (426) is mapped to destination node (456). Although three source nodes and three corresponding destination nodes are shown by way of example, the invention should not be limited to the quantity of nodes shown herein. In one embodiment, the source and destination sites (410) and (440), respectively, may have a greater or reduced quantity of nodes from that shown herein. Accordingly, a system is provided with source and destination site, with each site in communication with a local virtual machine repository.

Figure 5:
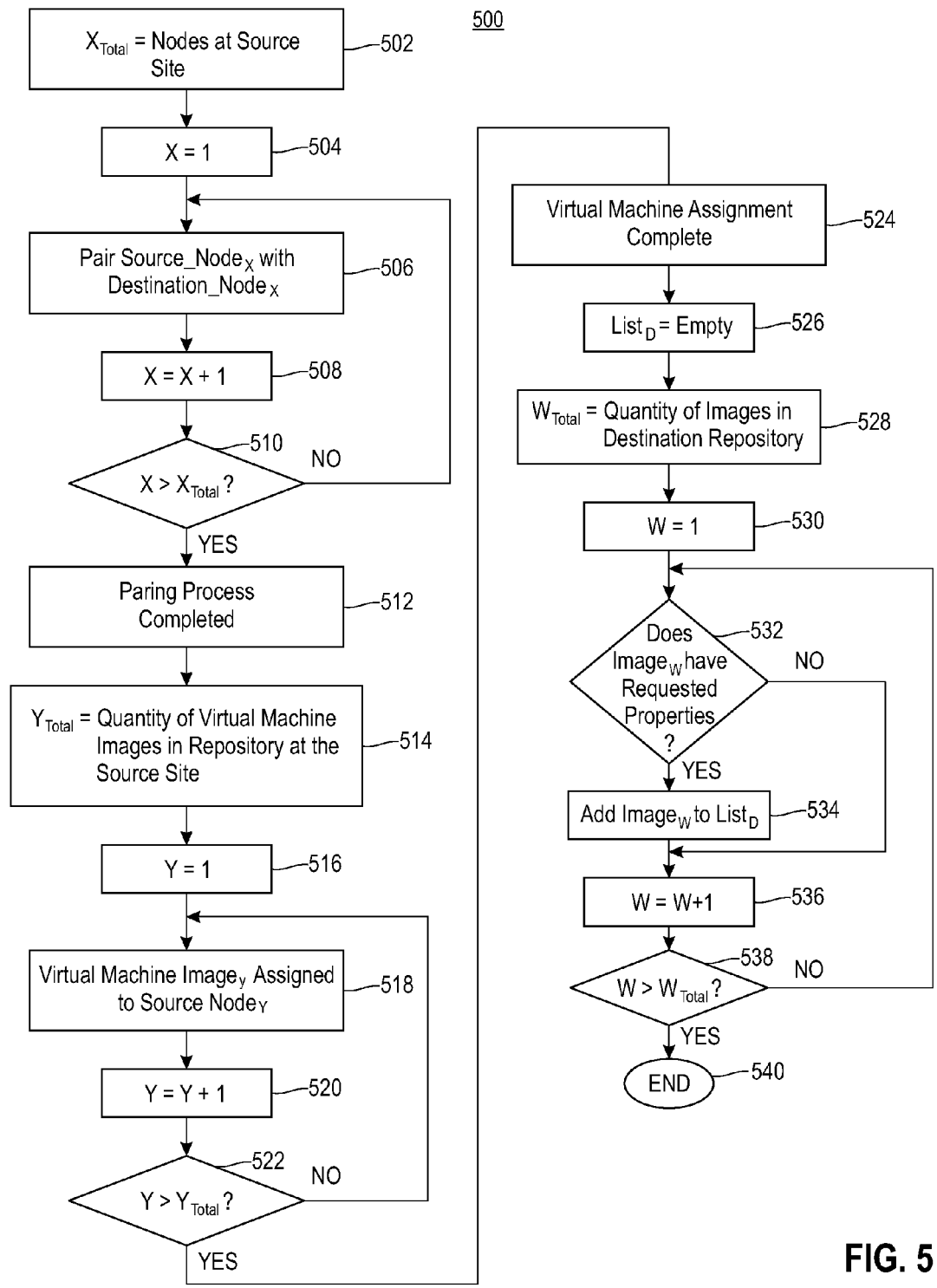
FIG. 5 depicts a flow chart illustrating pairing of the nodes, and more specifically for assignment of a source virtual machine image at a source node to a destination node.

As shown in FIG. 4, each source node is paired with a destination node. FIG. 5 is a flow chart (500) illustrating a process for the pairing of the nodes, and more specifically for assignment of a source virtual machine image at a source node to a destination node. The pairing process is a three part process, with the first part being the pairing of the source and destination nodes, the second part being the pairing of the source and source virtual machine images, and the third part being the pairing of the source virtual machine images at the assigned source hardware nodes to the destination virtual machine images. The variable $X_{Total}$ is assigned to the quantity of nodes at the source site (502), following by setting the counting variable X to the integer one (504). The source node associated with the counting variable X, source_node$_X$, is paired with a corresponding destination node associated with the counting variable X, destination_node$_X$ (506). Following the assignment at step (506), otherwise known as the pairing of the source and destination nodes, the counting variable X is incremented (508). It is then determined if all of the source nodes have been paired with a corresponding destination node (510). If any source nodes remain that are not paired, the process returns to step (506) for further assignment of non-paired source nodes. Conversely, if all of the source nodes have been assigned to a corresponding destination node, then the pairing process of the nodes is completed (512). Accordingly, the first part of the pairing process as demonstrated herein pertains to pairing of hardware nodes at the source site with hardware nodes at the destination site.

The choice of having one to one mapping is to simplify the design only. In one embodiment, the number of nodes at the source (X) and at the destination (Y) can be different. If the numbers are different (say X>Y) then more than one source node is mapped with a single destination node. In this case, the destination nodes need to know how the hash space is divided among the source nodes. In one embodiment, the source nodes send the hash space information when they start pairing, i.e. each node announcing the hash range it is responsible for, the pairing is solved by providing the hash range information.

Following assignment of the hardware nodes at the source and destination sites, virtual machines images at the source site are assigned to the source nodes. The variable $Y_{Total}$ is assigned to the quantity of virtual machine images in the virtual machine repository at the source site (514), followed by setting the counting variable Y to the integer one (516). The virtual machine image associated with the counting variable Y is assigned to the corresponding source node at the source site associated with the counting variable Y (518). Following the assignment at step (518), the counting variable Y is incremented (520). It is then determined if all of the virtual machine images have been assigned to a source hardware node (522), which in one embodiment can be a running virtual machine. If any virtual machines images remain that are unassigned, the process returns to step (518) for further assignment of virtual machine images to source hardware nodes. Conversely, if all of the virtual machine images have been assigned to a source hardware node, then the assignment process of virtual machine images is completed (524). Accordingly, the second part of the pairing process as demonstrated herein pertains to assignment of a single virtual machine image to a single hardware node at the source site.

Once the assignment at step (524) is completed, the third and final part of the pairing process is undertaken, wherein similarities of source virtual machine images with destination virtual machine images is ascertained. In one embodiment, the source virtual machines images are not the same as the images at the destination repository. However, in one embodiment, the source virtual machine images may have similar properties to destination virtual machine images so that they may be selected from the images that are already present at the destination location without a requirement for overlapping migration. In one embodiment, the images at the destination repository are selected such that they have a common operating system as in the source images. As demonstrated below, the destination repository is searched for images similar to those in the source. An empty list, list$_D$, is created (526), and the variable $W_{Total}$ is assigned to represent the quantity of images in the destination repository (528). Following step (528), a counting variable W, representing counting of images in the destination repository is set to the integer one (530). Step (530) concludes the initiation steps, and is followed by a review of the images in the destination repository. More specifically, it is determined if image$_W$ has the requested properties (532). A positive response to the determination at step (532) is followed by adding image$_W$ to list$_D$ (534). Following step (534) or a negative response to the determination at step (532), the counting variable W is incremented (536), following by a test to determine if there are any more images in the destination repository that have not been evaluated for similarity of properties (538). If it is determined that there are more images to be evaluated, the process returns to step (532), whereas an inverse response to the determination concludes the evaluation of the images at the destination repository (540). Accordingly, available virtual machine images at the destination repository are evaluated for similarity of properties.

Figure 6:
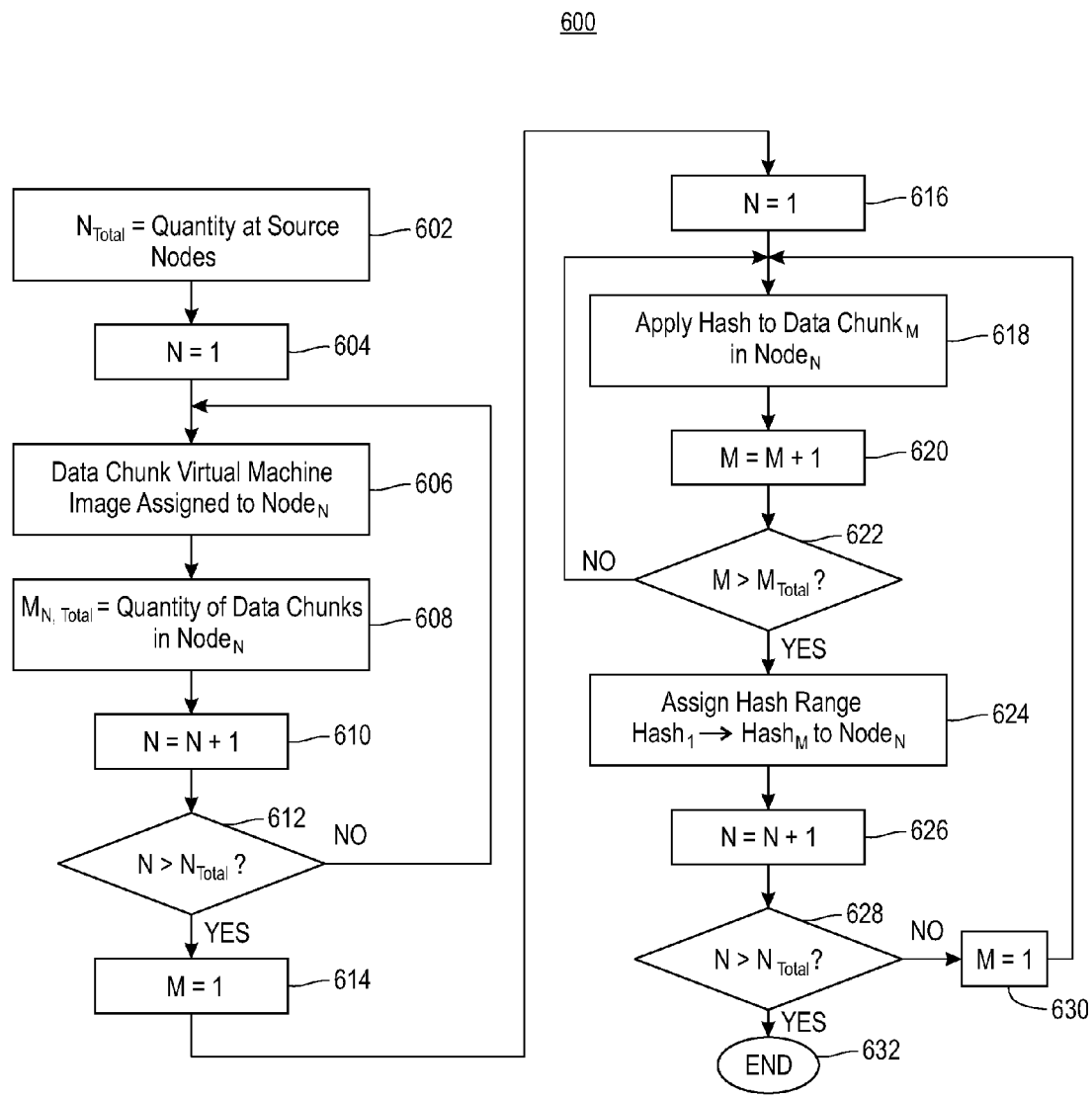
FIG. 6 depicts a flow chart illustrating chunking and hashing the virtual machine images at the source site.

To facilitate the migration of virtual machine images from the source site to the destination site, each virtual machine image is divided into data chunks, followed by assignment of a hash to each data chunk. FIG. 6 is a flow chart (600) illustrating the process of chunking and hashing the virtual machine images at the source site. The first part of the process is to apply a data chunking technique to all of the virtual machine images at the source site. As the scope of the invention does not pertain to the specifics of the data chunking technique, the details of the technique will not be described. There may be one or more virtual machine images at the source site, with one or more images assigned to every source node. However, in one embodiment there may not be a one-to-one mapping between images and source nodes. The quantity of source nodes is assigned to the variable $N_{Total}$ (602), and a node counting variable N is assigned to the integer one (604). A data chunking technique is applied to the virtual machine image of $Node_N$ (606), followed by assigning the quantity of data chunks in $Node_N$ is assigned to the variable $M_{N,Total}$ (608). As the data chunking process is completed for each node at the source site, the counting variable N is incremented (610). It is then determined if the data chunking algorithm has been applied to each of the virtual machine images (612). A negative response to the determination at step (612) is followed by a return to step (606). Conversely, a positive response to the determination at step (612) concludes the data chunking of the virtual machine images at the source site.

Once the data chunking algorithm is completed, a hash is applied to each data chunk. As shown, the counting variable M, representative of the data chunks, is assigned integer one (614), and the counting variable N is assigned the integer one (616). A hash is applied to data $chunk_M$ in $Node_N$ (618). Following step (618), the variable M is incremented (620). It is then determined if there are any more data chunks that need to be hashed for $Node_N$ (622). A positive response to the determination at step (622) is followed by a return to step (618). However, a negative response to the determination at step (622) is followed by assignment a hash range from $hash_1$ to $hash_M$ to $Node_N$ for storage in memory of $Node_N$ (624). As one aspect of the invention is not to overburden any one physical node with processing, a hash range is assigned to each node. In one embodiment, the hash range may be a range for each virtual machine assigned to its resident node, as demonstrated above. However, the invention should not be limited to this embodiment, as different virtual machine images may have different sizes and the hash range may need to be distributed among the nodes at the source site.

Following the assignment at step (624), the counting variable N is incremented (626). It is then determined if there are any more nodes at the source cite that have not been processed through the hashing of the virtual machine image (628). If there are nodes remaining to be processed, the counting variable M is reset to the integer one (630) followed by a return to step (618). Conversely, a negative response to the determination at step (628) concludes the hashing of the data chunks and assignment of the hash range to the respective node (632). Accordingly, the data chunks associated with the virtual machine images at the source site are hashed and a hash range is assigned to each source node with the assigned hash range stored in local memory of the respective source node.

To reduce the burden associated with both storage and migration, there is no need for a node at the source site to retain metadata for data chunks, i.e. hash, that are not assigned to that specific node. As demonstrated above, in one embodiment the assigning and retention of hashes at the assigned node may take place during the hashing process. However, in the event that it does not take place at the time of the hashing process, the source nodes exchange metadata in order for each node to hold only the metadata for data chunks with hash values in its assigned range. Different sorting and comparison algorithms may be applied to support the assignment and retention of hashes local to the assigned node.

Figure 7:
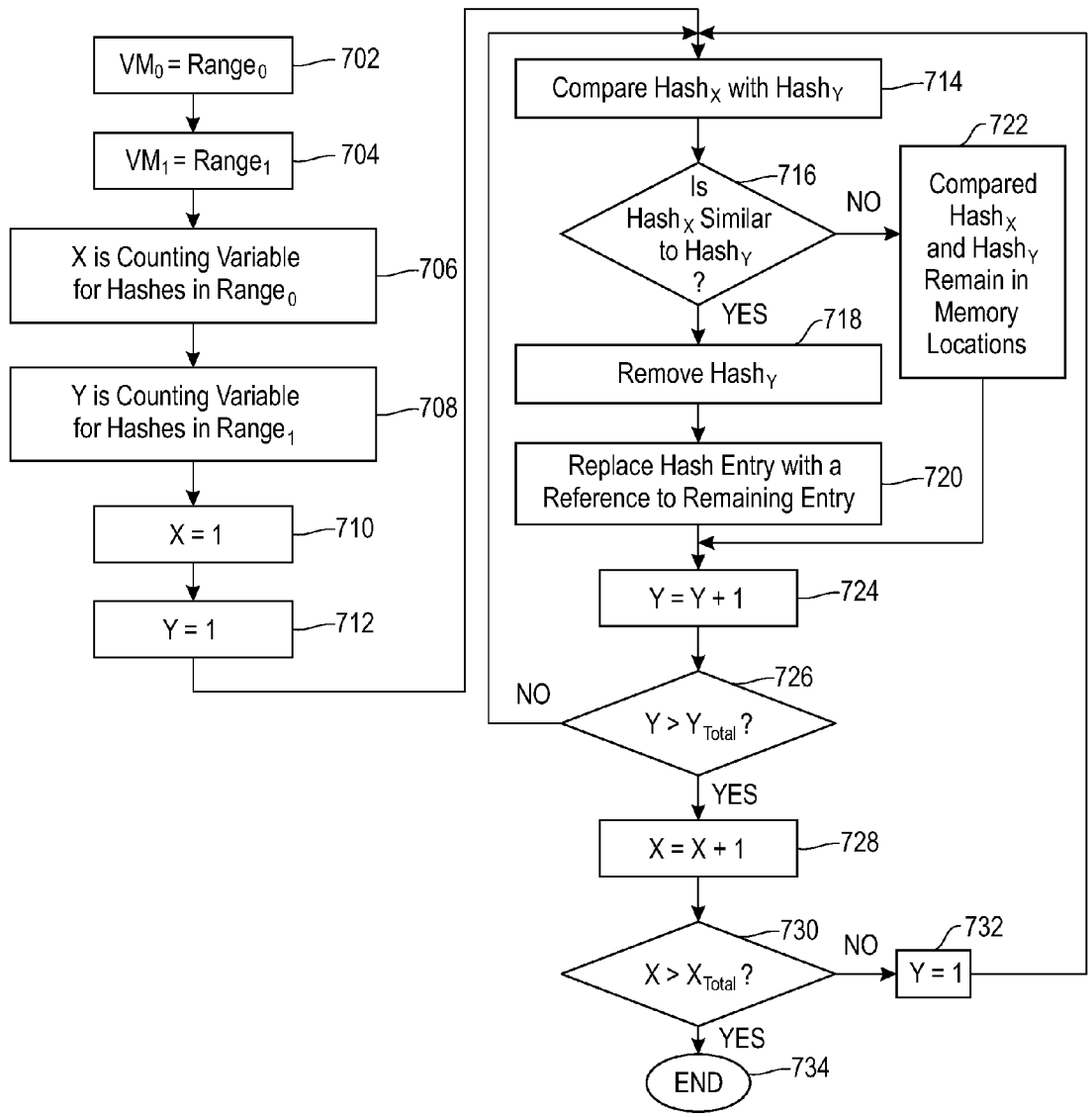
FIG. 7 depicts a flow chart illustrating streamlining hash references at the source site by removing redundant copies of hashed data chunks.

In addition to the assignment and retention of metadata to the assigned node, duplicate copies of the same or similar hashes local to the source site may be removed. FIG. 7 is a flow chart (700) illustrating a process for streamlining hash references at the source site by removing redundant copies of hashed data chunks. In the example shown herein, the process is demonstrated for two virtual machine images at the source site. However, the invention is not limited to this quantity of virtual machine images, as the quantity may be larger or smaller depending upon the configuration of the source site. A first virtual machine image, $VM_0$, is identified as having a hash range of data chunks identified as $Range_0$ (702). Similarly, a second virtual machine image, $VM_1$, is identified as having a hash range of data chunks identified as $Range_1$ (704). In one embodiment, a counting variable X is employed for the hashes in $Range_0$ (706), and a counting variable Y is employed for the hashes in $Range_1$ (708). Both counting variables are initialized (710) and (712), respectively. $Hash_X$ for $VM_0$ is compared to $hash_Y$ for $VM_1$ (714), and it is determined if the hashes are similar (716). If the hashes are determined to be similar, one of the hashes is removed from memory of the subject source node (718), and the removed hash is replaced with a reference to the location of the hash remaining in memory (720). In one embodiment, the determined duplicate or near duplicate hash in $VM_1$ is removed at step (718), a reference to the hash is placed in a memory of the subject node with the reference identifying a location of the hash in memory of another source node.

As mentioned above, each of the hashes of the different virtual machine images are compared. A negative response to the determination at step (716) allows the compared hashes to remain in their respective memory locations (722), following by an increment of the counting variable Y (724). It is then determined if all of the hashes in $Range_1$ have been compared to the subject $Hash_X$ in $Range_0$ (726). A negative response to the determination at step (726) is followed by a return to step (714). Conversely, a positive response to the determination at step (726) is following by an increment of the counting variable X (728). It is then determined if all of the hashes in $Range_0$ have been compared to the subject $Hash_Y$ in $Range_1$ (730). A positive response to the determination at step (730) concludes the comparison of hashes and elimination of duplicate hashes (734), whereas a negative response to the determination at step (730) is followed by resetting the counting variable Y to the integer one (732) and a return to step (714). Accordingly, duplicate data chunk references among the source nodes are eliminating by comparison of hash values for each of the virtual images at the source site.

As demonstrated in FIGS. 5-7, each of the virtual machine images at the source site are processed through data chunking with a hashing algorithm applied to each chunk. A unique hash is assigned to each data chunk. Each source node is responsible for part of the hash value space, and those hash values are stored in local memory of the subject source node. In one embodiment, each node is limited to few virtual machine images, so that each source node chunks and hashes one or fewer virtual machine images. At the same time, each source node is responsible for a select part of the hash value space and only retains that hash values within its space. A comparison of hash values across the source nodes takes place in order to eliminate duplicate hash values, with each duplicate removed and replaced with a reference to the source node location with the retained hash value.

Figure 8:
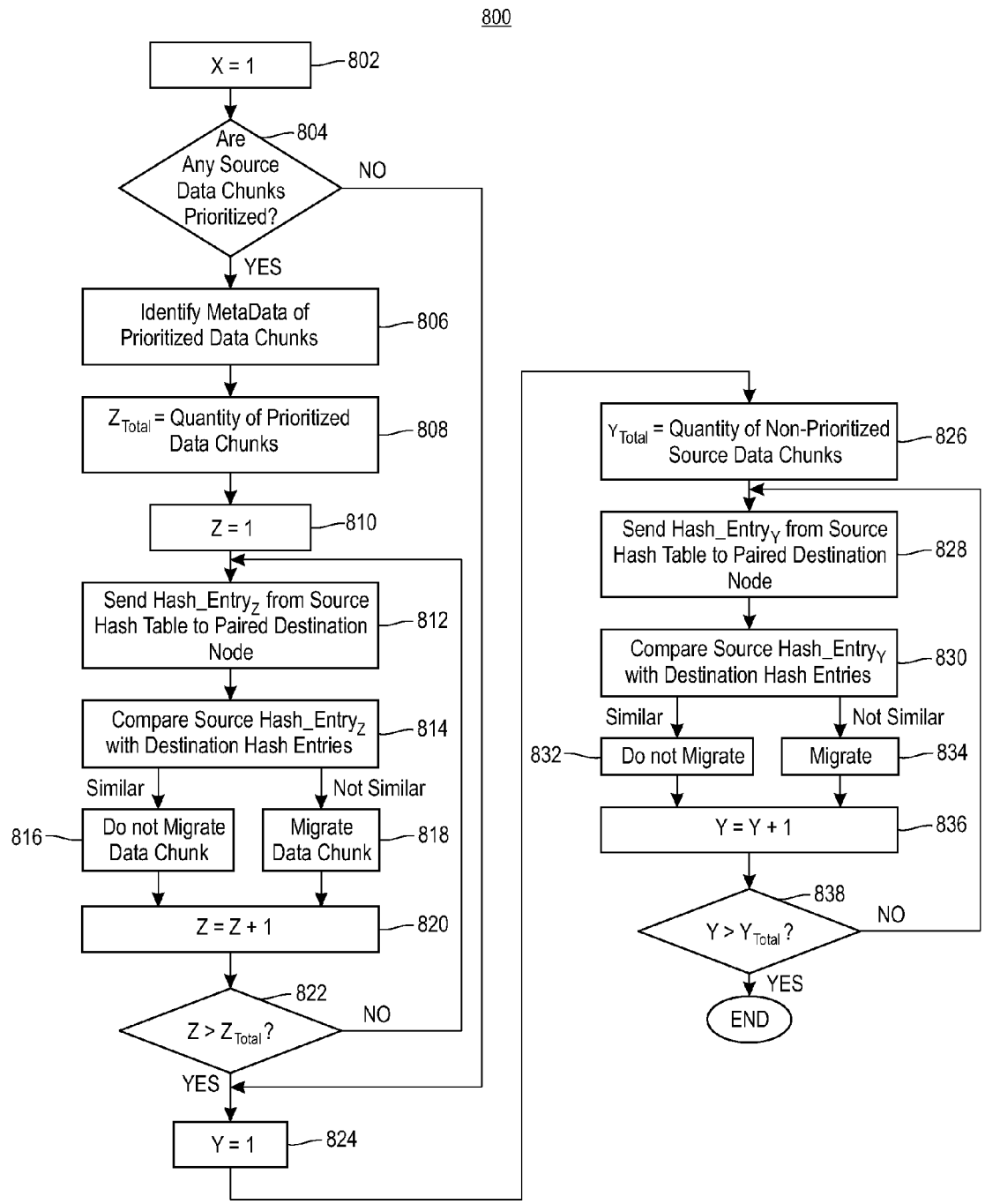
FIG. 8 depicts a flow chart illustrating migrating data chunks from the source site to the destination site while supporting prioritized migration.

As shown in FIG. 5, each source node at a source site is paired with a destination node at a destination site, with each node limited to a single virtual machine image. Prior to migrating data chunks from a node at the source site, the data chunks may be prioritized in order to support a prioritized migration. At the same time, the destination nodes may contain data chunks and hashing of their virtual machine's images, similar to that demonstrated above with respect to the source nodes and source virtual machine images. Some data chunks may be required to be migrated from the source to the destination, some data chunks may already be present at the destination, and some of the data chunks to be migrated may be prioritized based upon a predefined ranking of the data chunks at the source or destination sites. FIG. 8 is a flow chart (800) illustrating a process for migrating data chunks from the source site to the destination site while supporting prioritized migration. A counting variable X is assigned to the integer one (802). Paired nodes exchange and compare metadata pertaining to the virtual machine image prior to migration. However, in the case of prioritization of data chunks, those identified data chunks are addressed before migration of non-prioritized data chunks. As such, it is determined if there are any data chunks at the source site identified for prioritized migration (804). A positive response to the determination at step (804) is followed by analysis of the prioritized metadata and their associated data chunks, and a negative response to the determination at step (804) is followed by an ordered exchange and comparison of the metadata and the associated data chunks. Accordingly, hash entries representing data chunks required to support a boot operation are prioritized for migration.

Following a positive response to the determination at step (804), the metadata representing the prioritized data chunks is identified (806) and a variable $Z_{Total}$ is assigned to the quantity of identified data chunk entries (808). In one embodiment, the data chunk entries are organized in a hash table with a set of incremental integers assigned to the prioritized hash entries in order of prioritization. A counting variable Z is set to the integer one (810). The hash_entry$_Z$ in the source hash table is sent to the paired destination node (812) and compared to the hash entry at the destination site (814). If at step (814) it is determined that the destination hash value range contains a similar or equivalent hash value for the subject hash entry, hash_entry$_Z$, then the associated data chunk is not migrated to the destination node (816). Conversely, if at step (814) it is determined that the subject hash value is not present at the destination node, then the associated data chunk is migrated from the source node to the destination node (818). Following either step (816) or (818), the counting variable Z is incremented (820) followed by determining whether there are additional prioritized hash entries that have not been evaluated for migration (822). A positive response to the determination at step (822) is followed by a return to step (812). However, a negative response to the determination at step (822) concludes evaluation of the prioritized hash entries. Accordingly, the migration process evaluates metadata of one or more prioritized hash entries prior to evaluation of non-prioritized entries, and only migrates data chunks following the metadata evaluation.

As shown above, a specified quantity of hash entries may be prioritized for migration. However, not all of the hash entries need to be assigned a priority designation. Following a negative response to the determination at step (804) or a positive response to the determination at step (822) an ordered exchange and comparison of the metadata and the associated data chunks takes place. A counting variable Y is set to the integer one (824), and the variable $Y_{Total}$ is assigned to the quantity of data chunk entries that have not been designated with a priority assignment (826). The hash_entry$_Y$ in the source hash table is sent to the corresponding destination node (828) and compared to the hash entry at the destination site (830). In one embodiment, a file chunk map is employed to include an assignment of a destination hash value range to a source hash value range of the paired source node. If at step (830) it is determined that the destination hash value range contains a similar or equivalent hash value for the subject hash entry, hash_entry$_Y$, then the associated data chunk is not migrated to the destination node (832). Conversely, if at step (830) it is determined that the subject hash value is not present at the destination node, then the associated data chunk is migrated from the source node to the destination node (834). Accordingly, metadata of each hash entry received at the destination site is compared with existing hash entries prior to completion of migration from the source.

Following steps (832) or (834), the counting variable Y is incremented (836) followed by determining whether there are additional prioritized hash entries that have not been evaluated for migration (838). A positive response to the determination at step (838) is followed by a return to step (828). However, a negative response to the determination at step (838) concludes evaluation of the non-prioritized hash entries. Accordingly, the migration process evaluates all of the non-prioritized hash entries following evaluation of prioritized hash entries.

Figure 9:
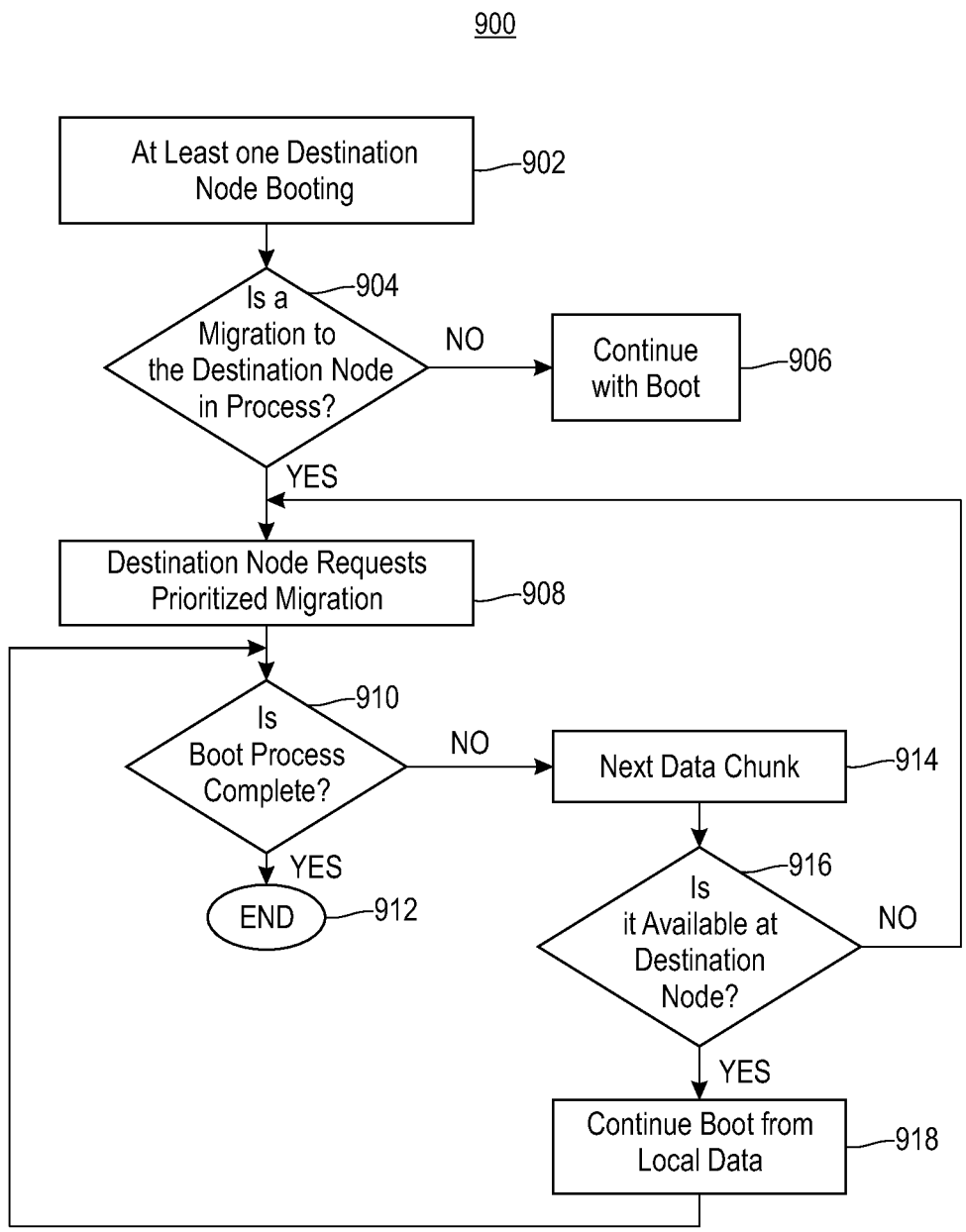
FIG. 9 depicts a flow chart illustrating migration that accounts for activity on at least one node at the destination site.
Figure 10:
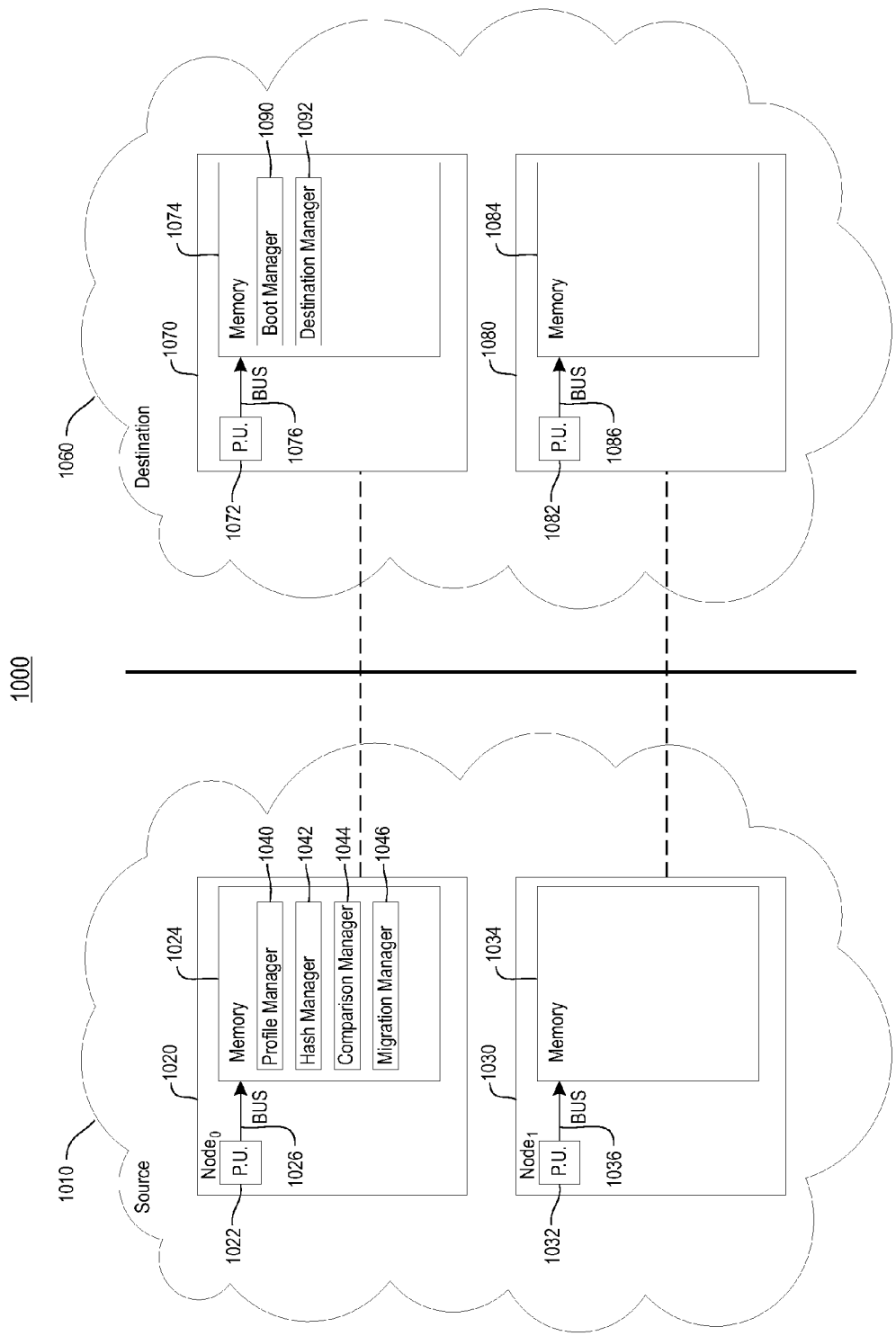
FIG. 10 depicts a block diagram illustrating tools embedded in a shared pool of resources to support co-migration from a source site to a destination site, and is suggested for printing on the first page of the issued patent.

Migration from a source site to a destination site may proceed based upon the state of one or both of the sites. FIG. 9 is a flow chart (900) illustrating a process for migration that accounts for activity on at least one node at the destination site. As shown, at least one of the nodes at the destination site is in the process of booting a virtual machine image (902). During the boot process, it is determined if a migration process to the destination node is in-progress (904). A negative response to the determination at step (904) is followed by the destination node continuing with the boot process (906). However, a positive response to the determination at step (904) is followed by the destination node placing a request for a prioritized migration of a specific data chunk to support the boot process (908). Following step (908), it is determined if the prioritized migration of the requested data chunk has resulted in completion of the boot process (910). A positive response to the determination at step (910) enables the migration from the source to the destination node to conclude (912), and a negative response to the determination at step (910) is followed by a continuation of the boot process.

As the boot requires the next data chunk (914), it is determined if the required data chunk is available on the destination node (916). A positive response to the determination at step (916) enables the boot process to continue with local access to the required data chunk (918) followed by a return to step (910). However, a negative response to the determination at step (916) is followed by a return to step (908). Accordingly, as shown herein prioritized migration of one or more specified data chunks may be supported during the migration process.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to a flowchart illustration and/or block diagrams of methods, apparatus (systems) and computer program products according to embodiments of the invention. It will be understood that each block of the flowchart illustration and/or block diagrams, and combinations of blocks in the flowchart illustration and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 11:
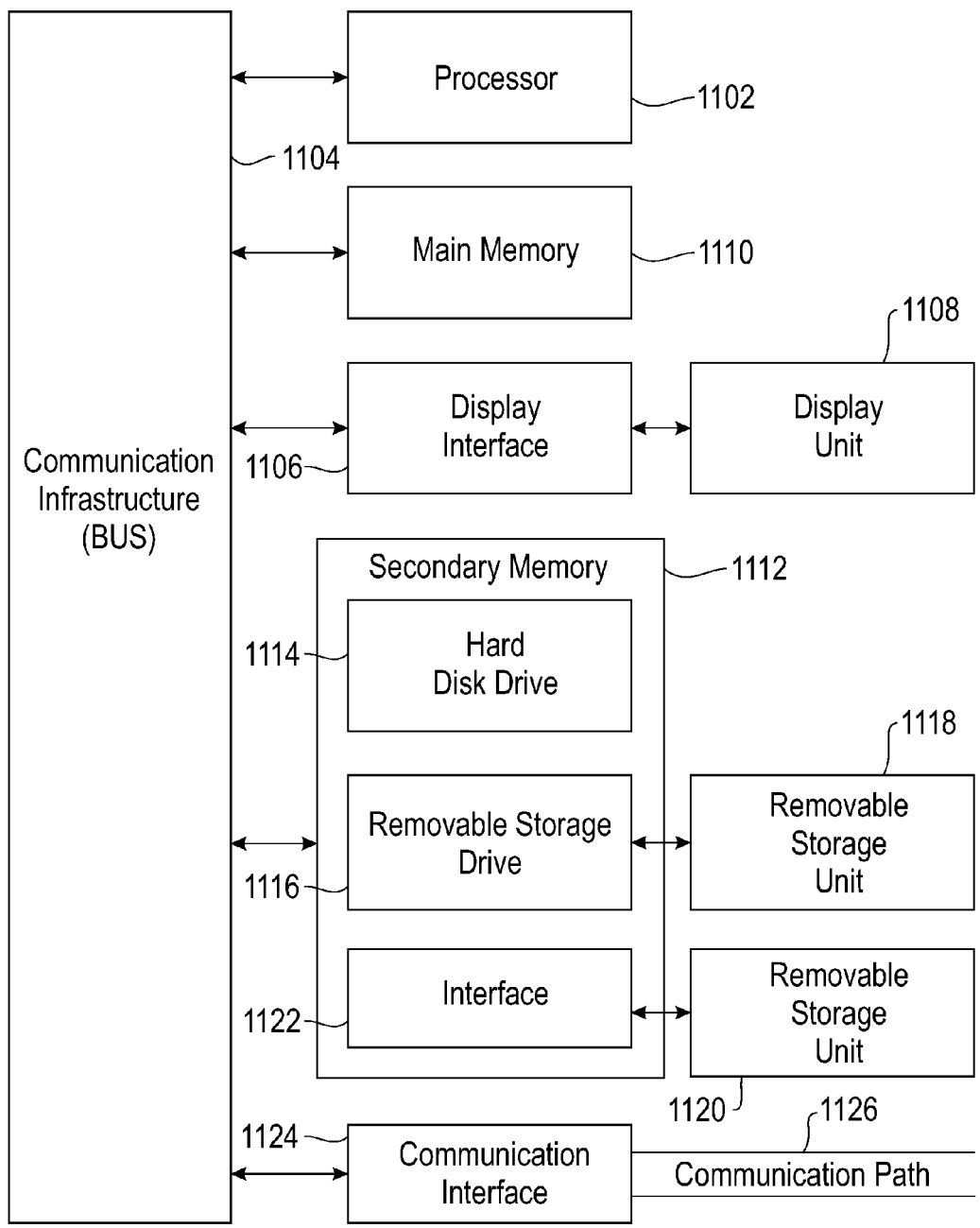
FIG. 11 depicts a block diagram showing a system for implementing an embodiment of the present invention.

Referring now to FIG. 11 is a block diagram (1000) showing a system for implementing an embodiment of the present invention. The computer system includes a source site (1010) and a destination site (1060), with both sites having at least two nodes. More specifically, the source site has a first node (1020) and a second node (1030). The first node (1020) has a processing unit (1022) in communication with memory (1024) across a bus (1026), and the second node (1030) has a processing unit (1032) in communication with memory (1034) across a bus (1036). Similarly, the destination site has a third node (1070) and a fourth node (1080), with the third node (1070) shown with a processing unit (1072) in communication with memory (1074) across a bus (1076), and the fourth node (1080) shown with a processing unit (1082) in communication with memory (1084) across a bus (1086). Although only two nodes are shown at both the source and destination sites, (1010) and (1060), respectively, the invention should not be limited to the quantity of nodes shown, as this quantity may be increased or decreased depending upon the configuration of the sites. In addition, each source node is shown paired with a single destination node. For example source node (1020) is shown paired with destination node (1070), and source node (1030) is shown paired with destination node (1080). In one embodiment, the pairing may be different than the pairing shown herein.

As described above, there are different tools employed to support migration of virtual machines images from the source site (1010) to the destination site (1060). For purposes of illustration, the tools local to the source site (1010) will be described for only one of the nodes, and similarly, the tools local to the destination site (1060) will be described for only one of the nodes. In one embodiment, the tools described herein may be replicated across the nodes at each of the sites. A profile manager (1040) is provided in communication with one of the source nodes (1020) to profile a virtual machine image of the respective node. More specifically, the profile manager (1040) divides each virtual machine image assigned to the node into at least two data chunks, and then applies a hash value to each data chunk. In one embodiment, each hash value is unique with respect to the associated data chunk. In one embodiment, not all data chunks are equally weighted, and as such a priority designation may be assigned to one or more data chunks. The profile manager (1040) identifies those data chunks that should be assigned a priority, such as data chunks required to support a boot operation. A boot manager (1090) is shown in communication with a destination node (1070). The boot manager (1090) is provided to boot a virtual machine image at the destination node (1070) during migration. In one embodiment, the boot manager (1090) may place one or more requests with the migration manager to access one or more specific data chunks. For example, if during boot, the boot manager (1090) requires a data chunk that has not yet been migrated, the request placed with the source node (1030) effectively places a priority on the migration of the specified data chunk(s).

In an effort to balance the load across the nodes at both the source and destination sites (1010) and (1060), respectively, a hash manager (1042) is provided in communication with the profile manager (1040). The hash manager (1042) assigns a hash range to each node and stores hash values within the range in local memory of the assigned node. In the example shown herein, the hash manager stores the hash value in memory (1024). In one embodiment, the profile manager (1040) builds a file chunk map with an assignment of a destination hash value range to a designated destination node, with the destination hash value range being equivalent to the range in the paired source node. For example, a hash value range in the destination node (1070) paired with the source node (1030) should be equivalent. At the same time, the hash manager (1042) balances the load on the nodes at the source site (1010) by sending hash values outside of a designated range to an assigned range. For example, the hash manager (1042) sends each hash value outside of the range of source node (1030) to a node at the source site to which the hash value has been assigned.

In a further effort to support efficiency and mitigate issues with limited capacity of memory and bandwidth, a comparison manager (1044) is provided in communication with the hash manager (1042). The comparison manager (1044) compares hash values to identify duplicate hash value, and to remove an identified duplication. The removed duplicate is replaced with a reference to the location of a retained copy of the subject hash value. Accordingly, the comparison manager (1044) enables each node to remove identified duplication hash value within the range assigned to the respective node.

Once the comparison manager (1044) has completed the removal of identified duplicate hashes and their associated data chunks, a migration manager (1046) in communication with the comparison manager may proceed with migration to a paired node (1070) at the destination site (1060). Due to the paring of the identified duplicate hash value, the migration manager (1046) is limited to migrating non-duplicate data chunks.

The paired destination node (1070) is shown with a destination manager (1092) in communication with memory (1074). The destination manager (1092) writes data chunks available in local memory (1074) to a target image. At the same time, the destination manager (1092) communicates with the paired migration manager (1046) to limit migration of data chunks to those data chunks not available in an image local to the destination node (1070). Accordingly, the destination manager (1092) limits migration to those data chunks that are not already present at the destination node (1070).

As identified above, the profile, hash, comparison, migration, boot, and destination managers are shown residing in memory of the machine in which they reside. As described above, in different embodiment the managers may reside on different machines in the system. In one embodiment, the profile, hash, comparison, migration, boot, and destination managers may reside as hardware tools external to memory of the machine in which they reside, or they may be implemented as a combination of hardware and software. Similarly, in one embodiment, the managers may be combined into a single functional item that incorporates the functionality of the separate items. As shown herein, each of the manager(s) are shown local to one machine. However, in one embodiment they may be collectively or individually distributed across the shared pool of configurable computer resources and function as a unit to manage dynamic data evaluation and storage. Accordingly, the managers may be implemented as software tools, hardware tools, or a combination of software and hardware tools.

Referring now to FIG. 11 is a block diagram (1100) showing a system for implementing an embodiment of the present invention. The computer system includes one or more processors, such as a processor (1102). The processor (1102) is connected to a communication infrastructure (1104) (e.g., a communications bus, cross-over bar, or network). The computer system also includes a main memory (1110), preferably random access memory (RAM), and may also include a secondary memory (1112). The secondary memory (1112) may include, for example, a hard disk drive (1114) and/or a removable storage drive (1116), representing, for example, a floppy disk drive, a magnetic tape drive, or an optical disk drive. The removable storage drive (1116) reads from and/or writes to a removable storage unit (1118) in a manner well known to those having ordinary skill in the art. Removable storage unit (1118) represents, for example, a floppy disk, a compact disc, a magnetic tape, or an optical disk, etc., which is read by and written to by removable storage drive (1116). As will be appreciated, the removable storage unit (1118) includes a computer readable medium having stored therein computer software and/or data.

In alternative embodiments, the secondary memory (1112) may include other similar means for allowing computer programs or other instructions to be loaded into the computer system. Such means may include, for example, a removable storage unit (1120) and an interface (1122). Examples of such means may include a program package and package interface (such as that found in video game devices), a removable memory chip (such as an EPROM, or PROM) and associated socket, and other removable storage units (1120) and interfaces (1122) which allow software and data to be transferred from the removable storage unit (1120) to the computer system.

The computer system may also include a communications interface (1124). Communications interface (1124) allows software and data to be transferred between the computer system and external devices. Examples of communications interface (1124) may include a modem, a network interface (such as an Ethernet card), a communications port, or a PCM-CIA slot and card, etc. Software and data transferred via communications interface (1124) are in the form of signals which may be, for example, electronic, electromagnetic, optical, or other signals capable of being received by communications interface (1124). These signals are provided to communications interface (1124) via a communications path (i.e., channel) (1126). This communications path (1126) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (1110) and secondary memory (1112), removable storage drive (1116), and a hard disk installed in hard disk drive (1114).

Computer programs (also called computer control logic) are stored in main memory (1110) and/or secondary memory (1112). Computer programs may also be received via a communication interface (1124). Such computer programs, when run, enable the computer system to perform the features of the present invention as discussed herein. In particular, the computer programs, when run, enable the processor (1102) to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be appreciated that, although specific embodiments of the invention have been described herein for purposes of illustration, various modifications may be made without departing from the spirit and scope of the invention. In particular, profiling the migration element herein is described with respect to a virtual machine image. More specifically, in one embodiment a set of instructions are provided in a computer readable data storage medium for migrating data sets. The instructions can process on real machines or virtual machines. In one embodiment, the data chunking, prioritization, and migration can be applied to data blocks, a data set, files, etc. Accordingly, the invention should not be limited to the migration and processing of virtual machine images. Furthermore, whether applied to the virtual machine image or data, using the profile to prioritize chunks according to the profile is a general mechanism that can be used in other applications, other than booting virtual machine images during migration. Profiling and profile based migration can be used to speed up any remote access by improving upon generic pattern-unaware pre-fetch policies of the filesystem. Accordingly, the scope of protection of this invention is limited only by the following claims and their equivalents.

We claim:
1. A method comprising:
two or more data sets operating in a computer system, with one data set assigned to a single node;
pairing each node in the computer system with a specific pair node;
profiling each data set, including dividing each data set into two or more data chunks and applying a hash value to each data chunk;
assigning a hash value range to each node, and storing hash values within the assigned hash value range in memory local to the assigned node;
eliminating duplicate data chunks associated with the two or more data sets, including comparing hash values of each of two or more data sets, and for each duplicate hash value retaining a single copy of the duplicate hash value;
virtual machine co-migration, including:
profiling the data sets to be migrated, wherein the data sets are virtual machine images, including identifying data chunks required to support a boot process of a virtual machine image and prioritizing migration of the identified data chunks; and
migrating the non-duplicate data chunks of the data sets from a selected node to a corresponding pair node including eliminating duplicate data chunks between the selected node and the corresponding pair node, wherein the migration of the non-duplicate data chunks is limited to migration between paired nodes.

2. The method of claim 1, further comprising booting a virtual machine image at a destination node during migration, including intercepting an I/O request of the destination node, and if the I/O requests access of a non-migrated data chunk, migrating the non-migrated data chunk at a high priority form the source node.

3. The method of claim 1, further comprising migrating the two or more data sets and their respective virtual machine images to two or more destination nodes, with each data set being paired from an originating node to a single destination node, and building a file chunk map including assignment of a destination hash value range to the destination node, wherein the destination hash value range is equivalent to a source hash value range of the paired source node.

4. The method of claim 3, further comprising one of the destination nodes finding a local data set that is similar to the migrated data set, including the destination node comparing hash values of data chunks of the local data set with hash values of the migrated data set.

5. The method of claim 4, wherein migrating the non-duplicate data chunks includes the destination node writing a data chunk available in local data sets to a target image and migrating a data chunk not available in local data sets from the source node to the destination node.

6. The method of claim 1, further comprising load balancing hash space of data sets, including sending a hash value outside of a subject node hash value range to a node assigned to the hash value range.

7. A system comprising:
a processor;
a profile manager to profile each data set, the profile manager to divide each data set into at least two data chunks and to apply a hash value to each data chunk;
the profile manager to pair each node in the computer system with a pair node;
hash manager in communication with the profile manager, the hash manager to assign a hash range to each node and to store hash values within the range in local memory of the assigned node;
a comparison manager in communication with the hash manager, the comparison manager to compare hash values of each of the data sets, and to retain a single copy of an identified duplicate hash value, with each node to retain non-duplicate data chunks of the two or more data sets within the hash value range assigned to the node;
virtual machine co-migration, including:
profiling the data sets to be migrated, wherein the data sets are virtual machine images, including identifying data chunks required to support a boot process of a virtual machine image and prioritizing migration of the identified data chunks; and
a migration manager in communication with the comparison manager, the migration manager to migrate the non-duplicate data chunks of the data sets from a selected node to a corresponding pair node including eliminating duplicate data chunks between the selected node and the corresponding pair node, wherein the migration of the non-duplicate data chunks is limited to migration between paired nodes.

8. The system of claim 7, further comprising a boot manager in communication with the profile manager, the boot manager to boot a virtual machine image at a destination node during migration, including placement of a request to the migration manager for access to a non-migrated data chunk, and the migration manager migrating the non-migrated data chunk at an increased priority.

9. The system of claim 7, further comprising the migration manager to migrate data sets and their virtual machine images to destination nodes, each data set paired from an originating node to a single destination node, including the profile manager to build a file chunk map having an assignment of a destination hash value range to the destination node, wherein the destination hash value range is equivalent to a source hash value range of the paired source node.

10. The system of claim 7, further comprising a destination manager to write a data chunk available in local memory to a target data set and to communicate with the migration manager to migrate a data chunk not available in a local data set from the source node to the destination node.

11. The system of claim 7, further comprising the hash manager to load balance hash space of data sets, including the hash manager to send a hash value outside of a subject node hash value range to a node assigned to the hash value range.

12. A computer program product, the computer program product comprising a non-transitory computer readable storage medium having computer readable program code embodied therewith, the computer readable program code comprising:
computer readable program code configured to pair each source node with a pair node;
computer readable program code configured to profile two or more data sets operating in a computer system, with one virtual machine image assigned to a single node;
computer readable program code configured to divide each data set into two or more data chunks and applying a hash value to each data chunk;
computer readable program code configured to assign a hash value range to each source and destination node, and storing hash values within the hash value range in memory local to the assigned node;
computer readable program code configured to eliminate duplicate data chunks associated with the data sets, including comparison of hash values of each of two or more data sets, and for each duplicate hash value retaining a single copy of the duplicate hash value;
virtual machine co-migration, including:
profiling the data sets to be migrated, wherein the data sets are virtual machine images, including identifying data chunks required to support a boot process of a virtual machine image and prioritizing migration of the identified data chunks; and
computer readable program code configured to migrate the non-duplicate data chunks from a selected source node to a corresponding pair node including eliminating duplicate data chunks between the selected source node and the corresponding pair node, wherein the migration of the non-duplicate data chunks is limited to migration between paired nodes.

13. The computer program product of claim 12, further comprising computer readable program code to prioritize migration of data chunks, including code to boot a virtual machine image at a destination node during migration and placement of a request for access to a non-migrated data chunk and migration of the non-migrated data chunk at an increased priority.

14. The compute program product of claim 12, further comprising computer readable program code to migrate virtual machines and their data sets, each data set paired from an originating node, including program code to build a file chunk map having an assignment of a hash value range to the destination node, wherein the destination hash value range is equivalent to a source hash value range of the paired source node.

15. The computer program product of claim 12, further comprising computer program code to write a data chunk available in local memory to a target data set and to migrate a data chunk not available in a local image from the source node to the destination node.

16. The computer program product of claim 12, further comprising computer program code to load balance hash space of data sets, including code to send a hash value outside of a subject node hash value range to a node assigned to the hash value range.

17. A method comprising:
in a computer system with a shared pool of resource, two or more data sets having one data set assigned to a single node;
pairing each node in the computer system with a pair node;
profiling each data set, including dividing each data set into two or more data chunks, applying a hash value to each data chunk, and prioritizing the data chunks;

assigning a hash value range to each node, and storing hash values within the hash value range of a data set in memory local to the assigned node;

eliminating duplicate data chunks in the system;

virtual machine co-migration, including:

profiling the data sets to be migrated, wherein the data sets are virtual machine images, including identifying data chunks required to support a boot process of a virtual machine image and prioritizing migration of the identified data chunks; and migrating the non-duplicate data chunks from a selected node to a corresponding paired node responsive to the prioritization, including eliminating duplicate data chunks between the selected node and the corresponding pair node, wherein the migration of the non-duplicate data chunks is limited to migration between paired nodes.

18. A method comprising:

two or more data sets operating in a computer system, with one data set assigned to a single node;

profiling each data set, wherein the data sets are virtual machine images, the profiling including dividing each data set into two or more data chunks, applying a hash value to each data chunk, identifying data chunks required to support a boot process of a virtual machine image, and prioritizing migration of the identified data chunks;

assigning a hash value range to each node, and storing hash values within the assigned hash value range in memory local to the assigned node;

eliminating duplicate data chunks associated with the two or more data sets, including comparing hash values of each of two or more data sets, and for each duplicate hash value retaining a single copy of the duplicate hash value, with each node retaining non-duplicate data chunks within the hash value range assigned to the node;

virtual machine co-migration, including:

profiling the data sets to be migrated, wherein the data sets are virtual machine images, including identifying data chunks required to support a boot process of a virtual machine image and prioritizing migration of the identified data chunks; and migrating the non-duplicate data chunks of the data sets, the migration including booting a virtual machine image at a destination node during migration, including intercepting an I/O request of the destination node, and if the I/O requests access of a non-migrated data chunk, migrating the non-migrated data chunk at a high priority form a source node.

* * * * *